(12) United States Patent
Yu et al.

(10) Patent No.: US 10,685,474 B2
(45) Date of Patent: Jun. 16, 2020

(54) METHOD FOR REPAIRING INCOMPLETE 3D DEPTH IMAGE USING 2D IMAGE INFORMATION

(71) Applicant: NATIONAL CENTRAL UNIVERSITY, Taoyuan (TW)

(72) Inventors: Yeh-Wei Yu, Taoyuan (TW);
Chi-Chung Lau, Taoyuan (TW);
Ching-Cherng Sun, Taoyuan (TW);
Tsung-Hsun Yang, Taoyuan (TW);
Tzu-Kai Wang, Taoyuan (TW);
Jia-Ching Wang, Taoyuan (TW);
Chien-Yao Wang, Taoyuan (TW);
Kuan-Chung Wang, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 89 days.

(21) Appl. No.: 16/194,847

(22) Filed: Nov. 19, 2018

(65) Prior Publication Data

US 2020/0035013 A1    Jan. 30, 2020

(30) Foreign Application Priority Data

Jul. 25, 2018   (TW) .............................. 107125792 A

(51) Int. Cl.
*G06T 15/04*    (2011.01)
*G06T 19/20*    (2011.01)

(52) U.S. Cl.
CPC .............. *G06T 15/04* (2013.01); *G06T 19/20* (2013.01); *G06T 2200/04* (2013.01)

(58) Field of Classification Search
CPC ......... G06T 15/04; G06T 19/00; G06T 19/20; G06T 5/005; G06T 5/50; G06T 7/00;
(Continued)

(56) References Cited

U.S. PATENT DOCUMENTS 7,239,314 B2 *  7/2007  Johnston ................. G06T 15/02
                                                 345/426
8,669,325 B1 *  3/2014  Hyman .................... B41M 1/30
                                                  257/40
(Continued)

FOREIGN PATENT DOCUMENTS

CN          105487121 A  *  4/2016

OTHER PUBLICATIONS

Xiao-Zhi Gao "3D Reconstruction of a Scene From Multiple 2D Images", International Journal of Civil Engineering and Technology, vol. 8, Issue 12, Dec. 2017, pp. 324-331 (Year: 2017).*

*Primary Examiner* — Mekonen T Bekele
(74) *Attorney, Agent, or Firm* — Juan Carlos A. Marquez; Marquez IP Law Office, PLLC

(57) ABSTRACT

The present invention provides a method for repairing incomplete 3D depth image using 2D image information. The method includes the following steps: obtaining 2D image information and 3D depth image information; dividing 2D image information into 2D reconstruction blocks and 2D reconstruction boundaries, and corresponding to 3D reconstruction of blocks and 3D reconstruction boundaries; analyzing each 3D reconstruction block, partitioning into residual-surface blocks and repaired blocks; and proceeding at least one 3D image reconstruction, which extends with the initial depth value of the 3D depth image of each of the residual-surface block and covers all the corresponding repaired block to form a repair block and to achieve the purpose of repairing incomplete 3D depth images using 2D image information.

14 Claims, 20 Drawing Sheets

(58) Field of Classification Search
CPC ....... G06T 2200/04; G06T 2207/10024; G06T 2207/10028
See application file for complete search history.

(56) References Cited

U.S. PATENT DOCUMENTS

| | | | |
|---|---|---|---|
| 10,332,309 B2* | 6/2019 | Liu .......................... | G06T 17/05 |
| 2014/0229143 A1* | 8/2014 | Cohen-Or ............... | G06T 17/10 |
| | | | 703/1 |
| 2014/0334737 A1* | 11/2014 | Shao ...................... | G06K 9/481 |
| | | | 382/197 |
| 2017/0019653 A1* | 1/2017 | Chen ........................ | G06T 7/00 |

\* cited by examiner

METHOD FOR REPAIRING INCOMPLETE 3D DEPTH IMAGE USING 2D IMAGE INFORMATION

BACKGROUND OF THE INVENTION

1. Technical Field

The present invention relates to a method for repairing an incomplete 3D depth image using 2D image information. More particularly, the invention relates to a method applied to a 3D image capture system to repair incomplete 3D depth images using 2D image information.

2. Description of Related Art

From black-and-white to color, from analog to high-definition (HD), display devices have evolved at astounding speed since their invention less than a century ago, but all the displays on the current market are still planar ones. The advent of three-dimensional (3D) images has given rise to the need to display images with depths.

Nowadays, color 3D image scanning generally requires the use of two types of modules, namely color camera modules for capturing two-dimensional (2D) images and modules for capturing 3D spatial information, the latter of which typically employ the structured light technique or the time of flight (TOF) technique.

The aforesaid two techniques, however, are subject to noise in the environment (the most common example of which is infrared noise) and may produce broken point clouds as a result. It is therefore an important issue in the related industry to develop an algorithm that can restore an incomplete point cloud of an object according to 2D image information regarding the position, surface, and boundary of the object.

BRIEF SUMMARY OF THE INVENTION

The present invention provides a method for repairing an incomplete 3D depth image using 2D image information, the major objective being to reduce distortion attributable to a lack of depth information in some of the 3D images captured.

The present invention provides a method for repairing an incomplete three-dimensional (3D) depth image using two-dimensional (2D) image information, comprising the steps of: obtaining image information, wherein the image information comprises 2D image information and 3D depth image information that correspond to each other; defining specific 2D blocks by dividing the 2D image information into a plurality of 2D reconstruction blocks and a plurality of 2D reconstruction boundaries corresponding respectively to the 2D reconstruction blocks, and transforming each said 2D reconstruction block into a corresponding 3D reconstruction block and a 3D reconstruction boundary corresponding to the 3D reconstruction block; obtaining residual-surface blocks by analyzing each said 3D reconstruction block and dividing each said 3D reconstruction block into a said residual-surface block, whose corresponding portion of the 3D depth image information includes depth value information, and a to-be-repaired block outside, and corresponding to, the residual-surface block; and performing 3D reconstruction by extending initial depth values of the portion of the 3D depth image information that corresponds to each said residual-surface block to the corresponding to-be-repaired block at least once such that the corresponding to-be-repaired blocked is covered with the initial depth values at least once and consequently forms a repaired block.

Implementation of the present invention at least produces the following advantageous effects:

1. 3D image defects can be effectively identified through analysis; and
2. 3D depth images can be repaired in a most economical manner.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

DETAILED DESCRIPTION OF THE INVENTION

Figure 1:
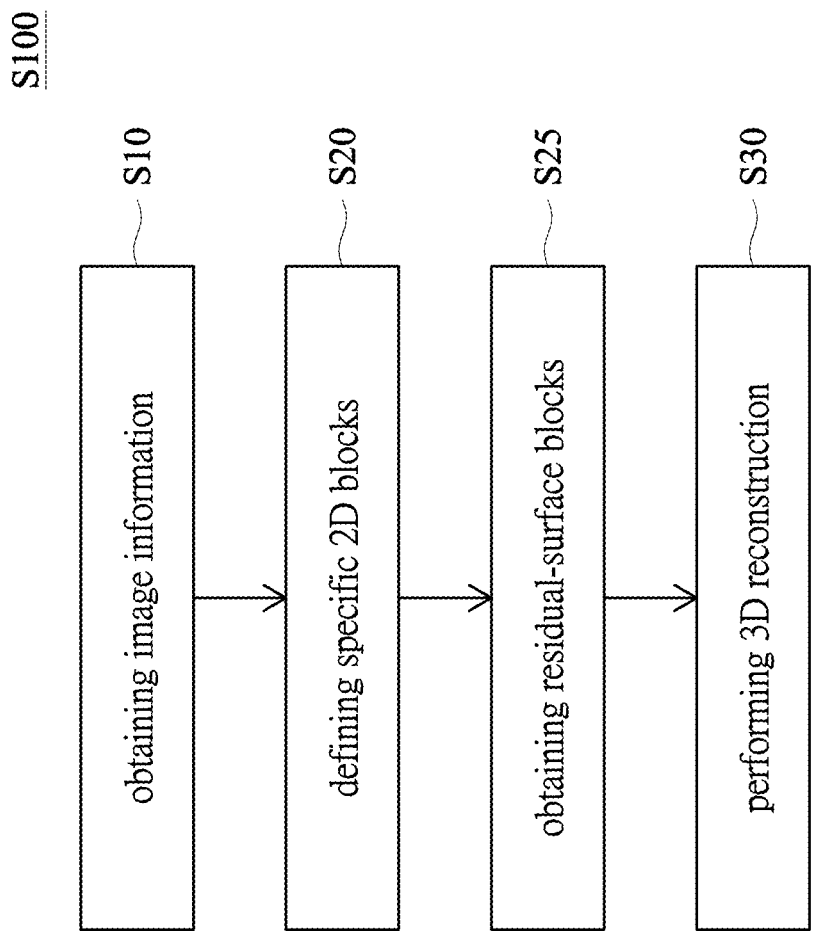
FIG. 1 is the flowchart of the method for repairing an incomplete 3D depth image using 2D image information according to an embodiment of the present invention.

Referring to FIG. 1, the method S100 for repairing an incomplete 3D depth image using 2D image information 20 (see FIG. 2) according to an embodiment of the present invention includes the steps of: obtaining image information (S10), defining specific 2D blocks (S20), obtaining residual-surface blocks (S25), and performing 3D reconstruction (S30).

Figure 2A:
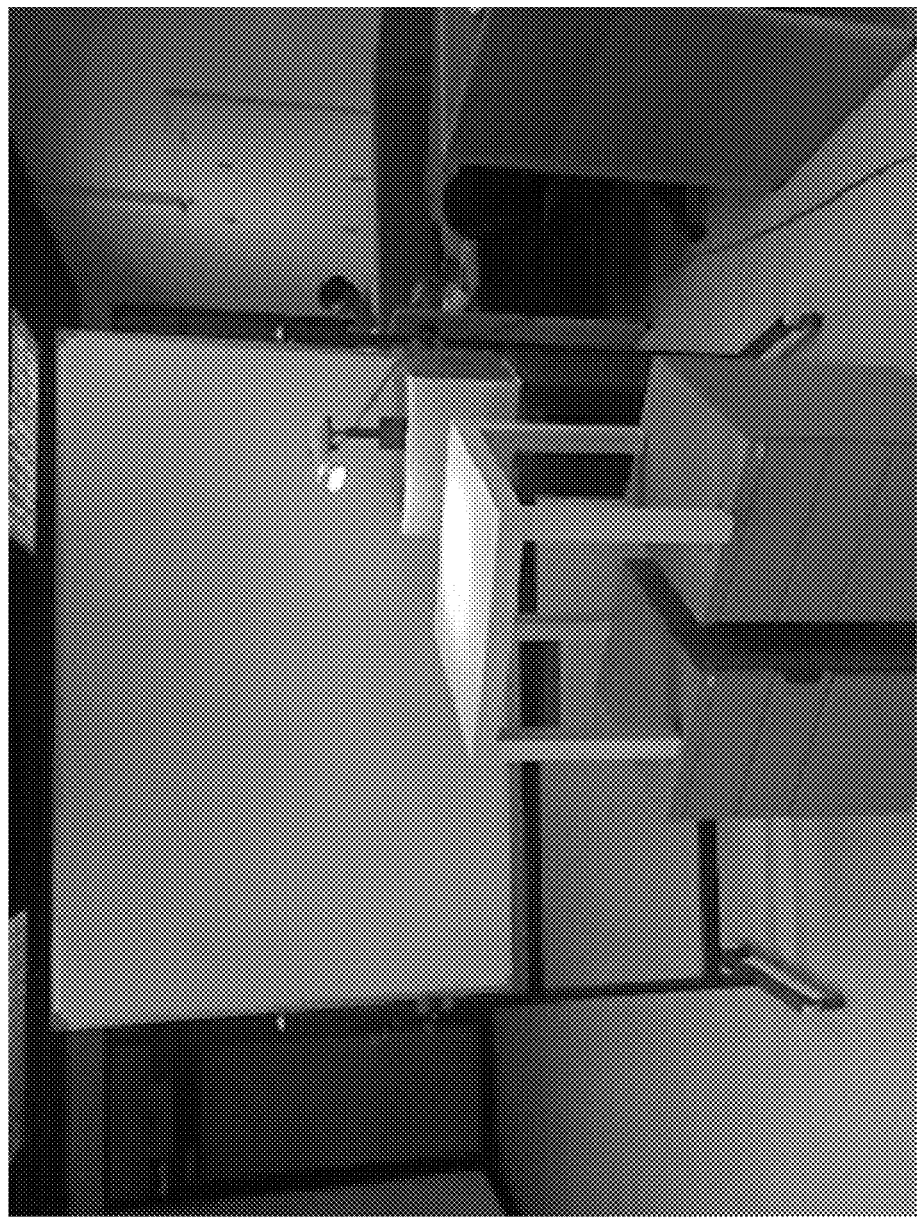
FIG. 2A shows an example of 2D image information according to the invention.
Figure 2B:
FIG. 2B shows an example of 3D depth image information according to the invention.

Referring to FIG. 2A and FIG. 2B, the step of obtaining image information (S10) involves capturing images with a 3D image capture device in order to obtain the desired image information. The image information obtained includes 2D image information 20 and 3D depth image information 30 that correspond to each other.

Figure 3:
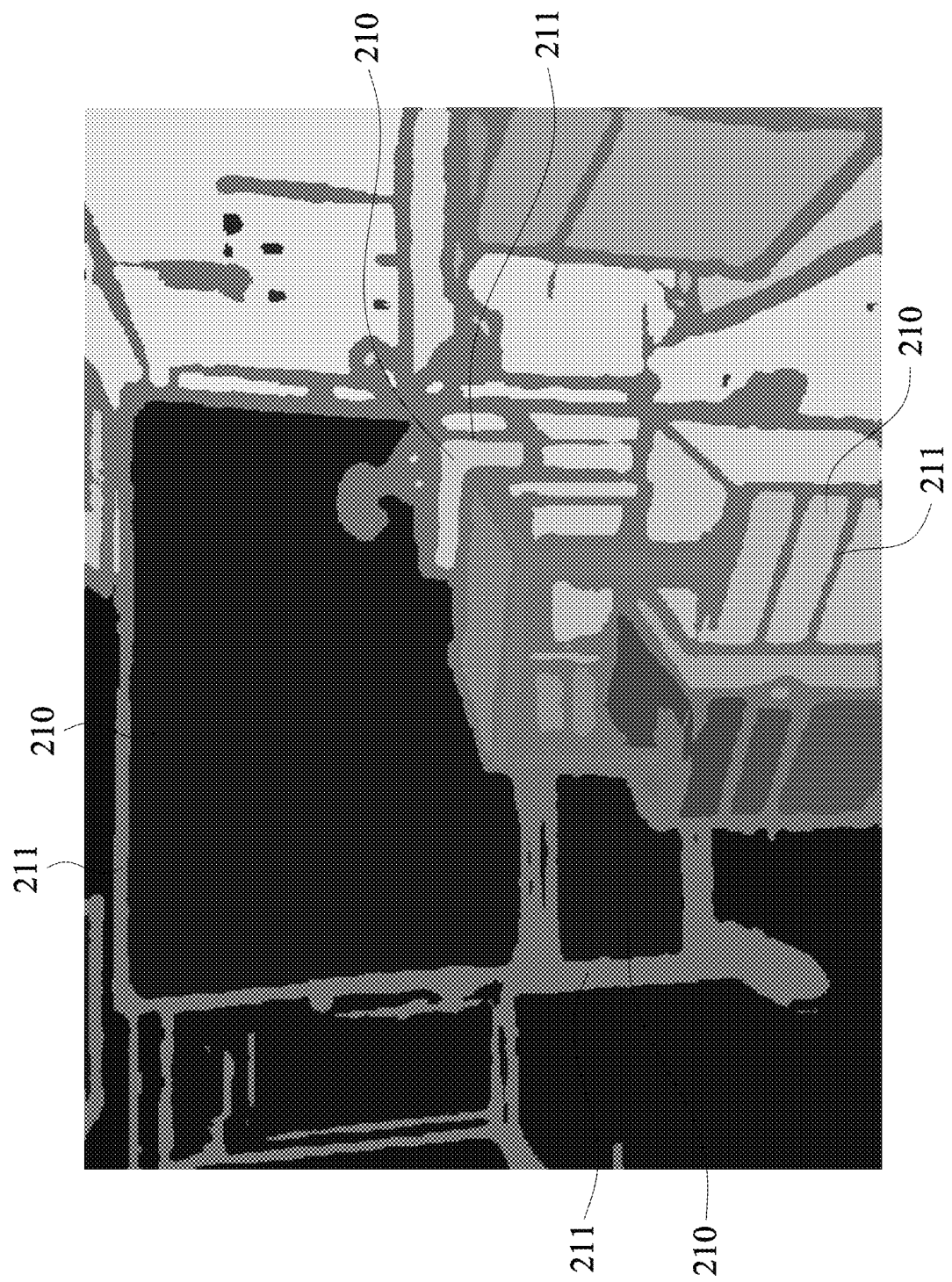
FIG. 3 shows an example of 2D reconstruction blocks according to the invention and their respective 2D reconstruction boundaries.

The step of defining specific 2D blocks (S20) is carried out as follows. To start with, referring to FIG. 3, the 2D image information 20 is divided into a plurality of 2D reconstruction blocks 210. Each 2D reconstruction block 210 corresponds to a 2D reconstruction boundary 211 of its own.

The 2D reconstruction blocks 210 can be defined by an artificial intelligence-based, color block-based, or boundary-based division technique. These techniques serve mainly to find out all the image blocks that may correspond to physical objects so that the image blocks can be identified as reconstruction units, i.e., the 2D reconstruction blocks 210.

Figure 4:
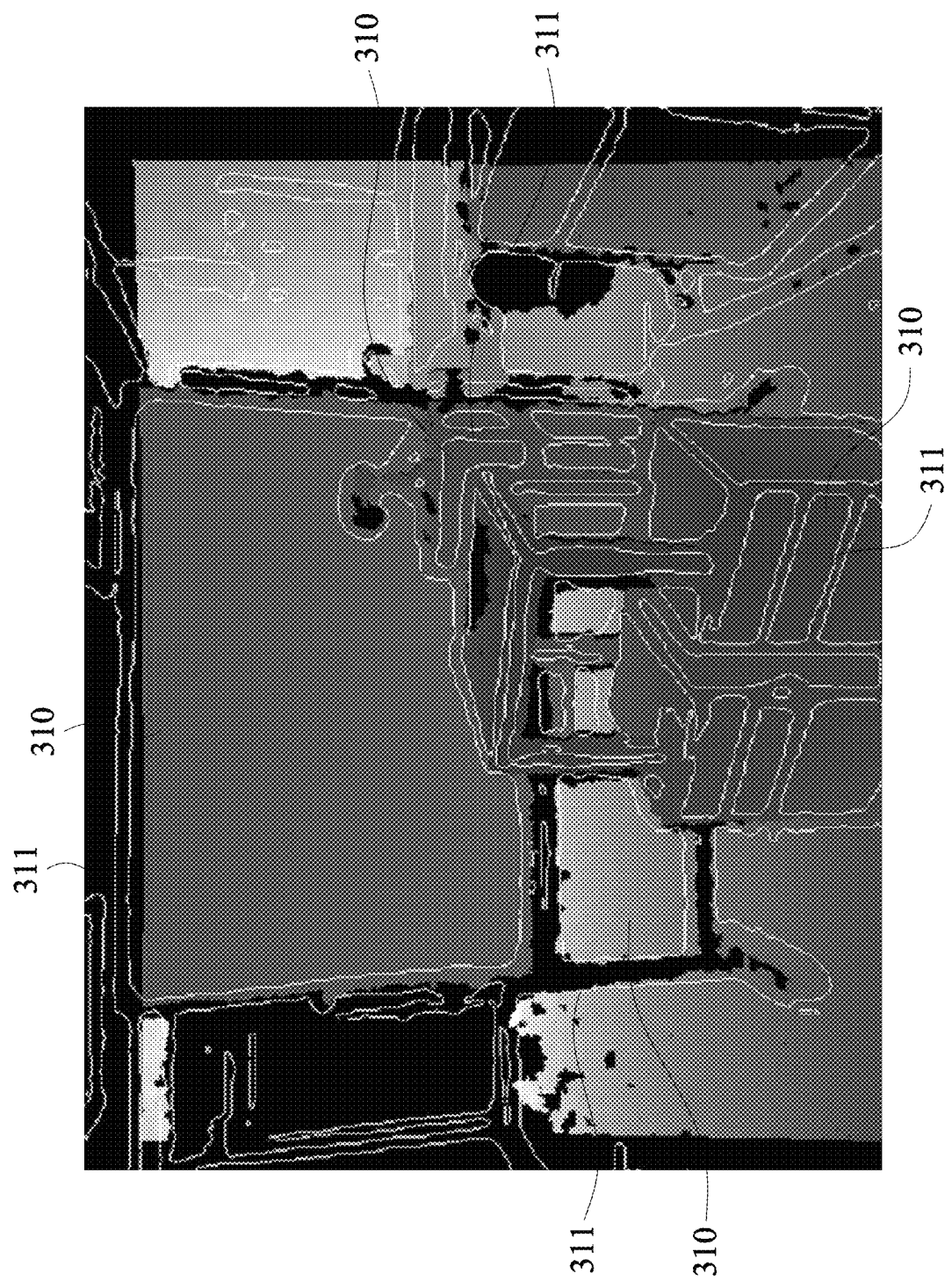
FIG. 4 shows an example of 3D reconstruction blocks according to the invention and their respective 3D reconstruction boundaries.

Referring to FIG. 4, as the 2D image information 20 and the 3D depth image information 30 correspond to each other, each 2D reconstruction block 210 can be transformed into a corresponding 3D reconstruction block 310, wherein each 3D reconstruction block 310 corresponds to a 3D reconstruction boundary 311 of its own. The 3D reconstruction blocks 310 will be used as the repair units in repairing the incomplete 3D depth image.

The step of obtaining residual-surface blocks (S25) is intended to find the normal region (i.e., a region with corresponding depth values) in each 3D reconstruction block 310 before repairing the incomplete 3D depth image. These normal regions (referred to herein as the residual-surface blocks 320) are the basis on which to repair the incomplete 3D depth image. Each residual-surface block 320 will be used to repair the to-be-repaired block 330 (i.e., a region without corresponding depth values) in the same 3D reconstruction block 310 as that residual-surface block 320.

More specifically, the step of obtaining residual-surface blocks (S25) involves analyzing each 3D reconstruction block 310, associating each 3D reconstruction block 310 with the 3D depth image information, and dividing each 3D reconstruction block 310 into a region whose corresponding portion of the 3D depth image information includes depth value information (i.e., a residual-surface block 320), and the region outside, and corresponding to, the residual-surface block 320 (i.e., a to-be-repaired block 330). The residual-surface blocks 320 are the basis for subsequent repairing steps.

Figure 5:
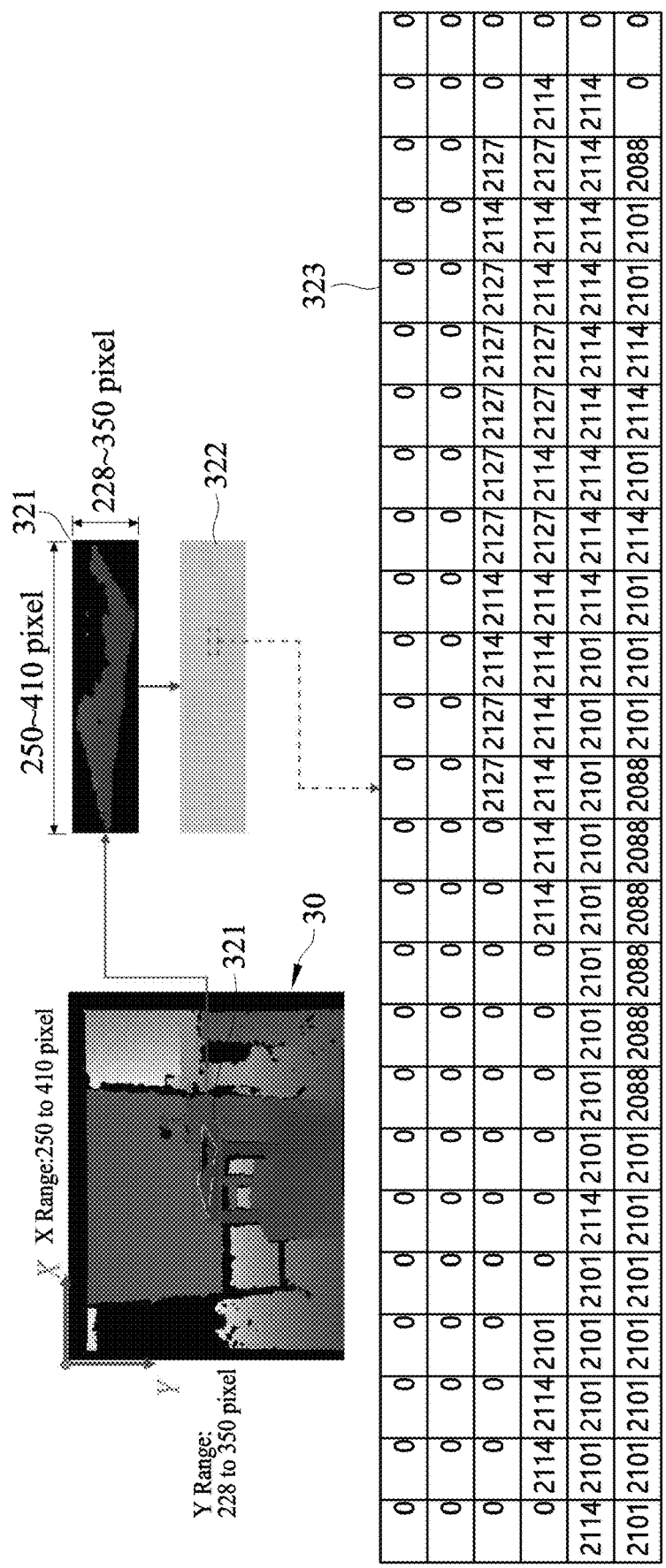
FIG. 5 shows an example of a residual-surface block (which has corresponding depth value information) according to the invention.

To facilitate computation, the step of obtaining residual-surface blocks (S25) is based on matrix calculations. FIG. 5 shows an example of how to generate a residual-surface block matrix 322. In this example, a partial 3D depth image 321, which corresponds to a selected 3D reconstruction block 310, is taken from the 3D depth image information 30; spans the 250$^{th}$~410$^{th}$ pixels in the X-axis direction and the 228$^{th}$~350$^{th}$ pixels in the Y-axis direction; and corresponds to the residual-surface block matrix 322. A partial enlarged view 323 of the residual-surface block matrix 322 is also shown in FIG. 5 to enable better understanding of the residual-surface block matrix 322.

Figure 6A:
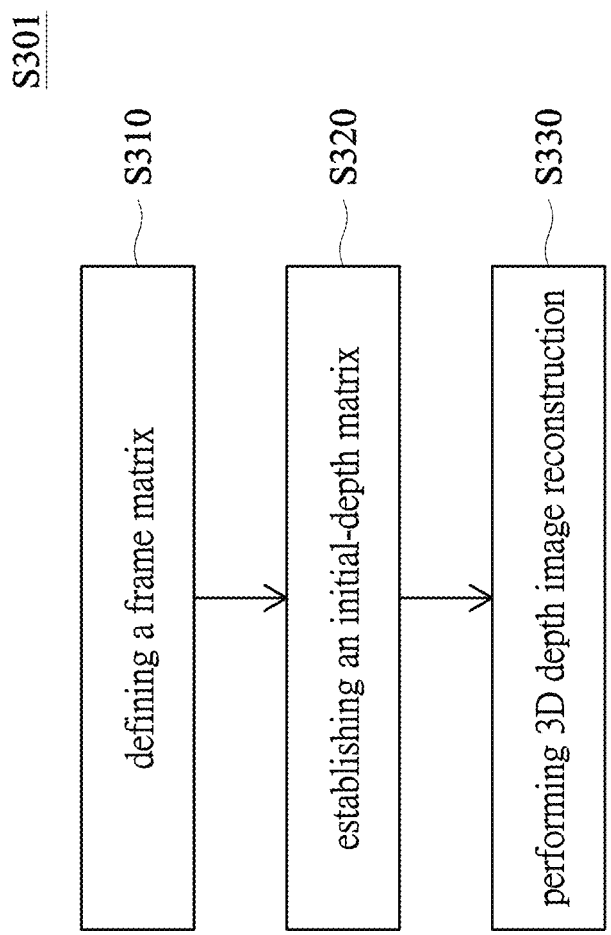
FIG. 6A is the flowchart of the first embodiment of performing 3D reconstruction according to the invention.

The step of performing 3D reconstruction (S30) is described below with reference to FIG. 6A and FIG. 6B, which show the first embodiment S301 of performing 3D reconstruction on a selected 3D reconstruction block 310 for example. The step of performing 3D reconstruction (S301) includes the sub-steps of: defining a frame matrix (S310), establishing an initial-depth matrix (S320), and performing 3D depth image reconstruction (S330).

Figure 6B:
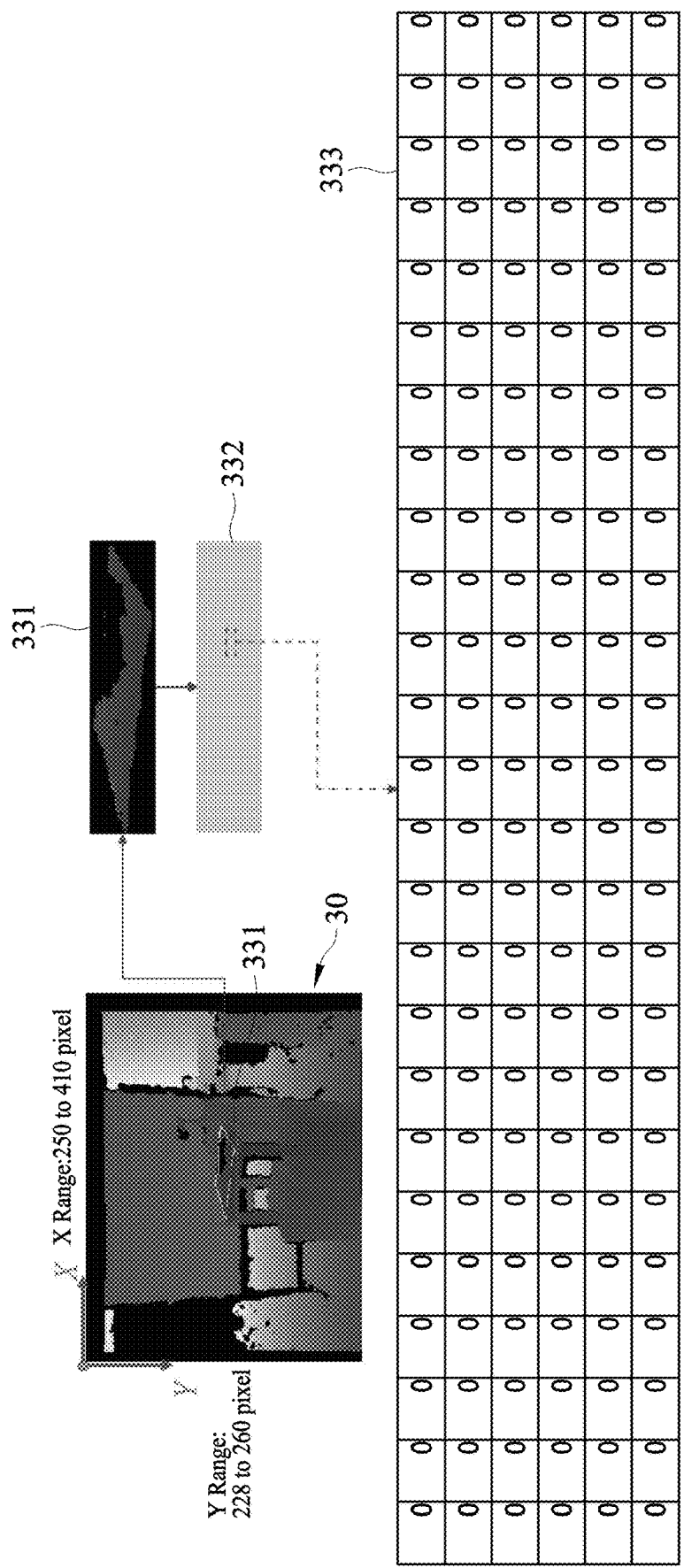
FIG. 6B shows an example of a computational frame matrix according to the invention.

FIG. 6B shows an example of how to generate a computational frame matrix 332. In this example, a partial depth image 331, which corresponds to the selected 3D reconstruction block 310, is taken from the 3D depth image information 30 and corresponds to the computational frame matrix 332. A partial enlarged view 332A of the computational frame matrix 332 is also shown in FIG. 6B to enable better understanding of the contents of the computational frame matrix 332.

More specifically, the sub-step of defining a frame matrix (S310) is carried out by setting a computational frame matrix 332, or Zexp(x,y) 332, whose size is larger than or equal to that of the selected 3D reconstruction block 310. The computational frame matrix 332, or Zexp(x,y) 332, is an empty matrix so that subsequent computation for the same space can share this computational frame.

Figure 6C:
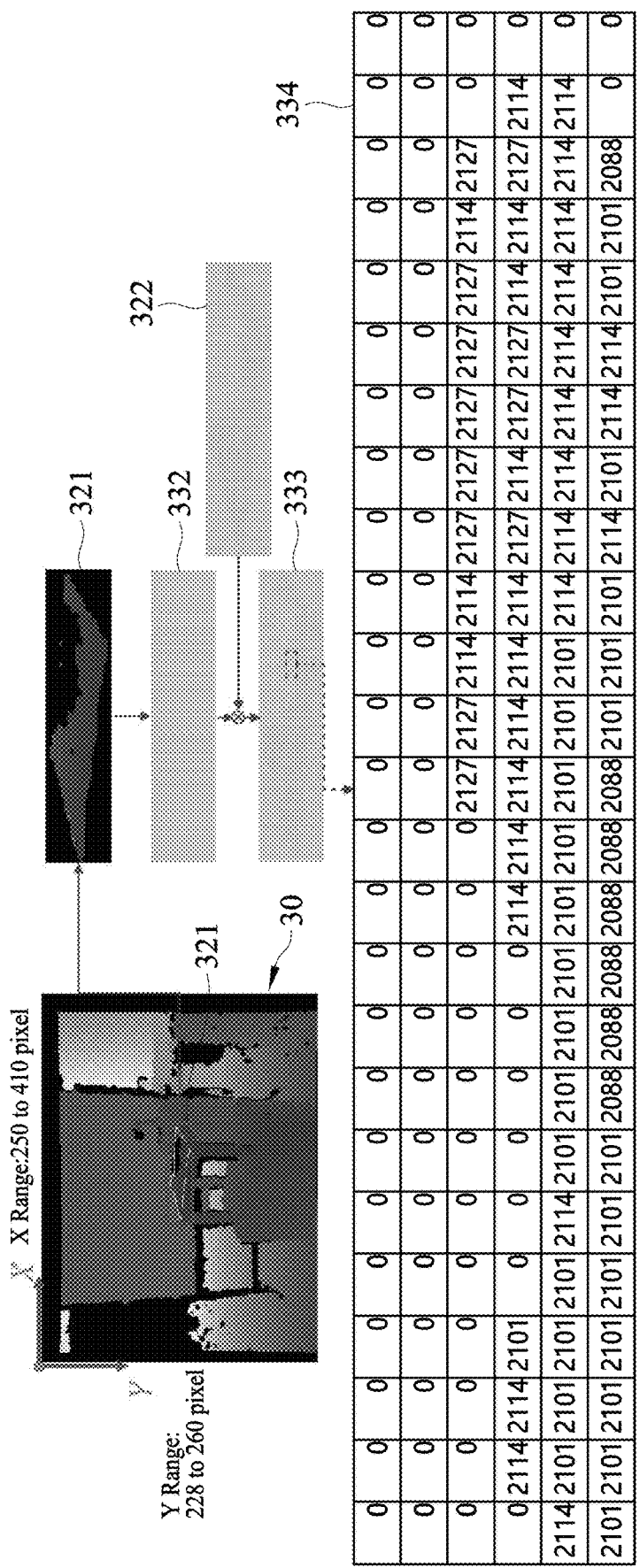
FIG. 6C shows an example of an initial-depth/first initial-depth matrix according to the invention.

FIG. 6C shows an example of how to generate an initial-depth/first initial-depth matrix 333. In this example, a partial 3D depth image 321, which corresponds to the selected 3D reconstruction block 310, is taken from the 3D depth image information 30 and corresponds to the computational frame matrix 332. The computational frame matrix 332 and the corresponding residual-surface block matrix 322 are added together to generate the initial-depth/first initial-depth matrix 333. A partial enlarged view 334 of the initial-depth/first initial-depth matrix 333 is also shown in FIG. 6C to enable better understanding of the initial-depth/first initial-depth matrix 333.

More specifically, the sub-step of establishing an initial-depth matrix (S320) is performed by filling the computational frame matrix 332 with the depth values corresponding to the selected 3D reconstruction block 310. During the process of filling the computational frame matrix 332 with depth values, the value 0 is used whenever an element of the computational frame matrix 332 does not have a corresponding depth value to fill with. An initial-depth matrix is formed when the filling process is completed.

The step of performing 3D reconstruction (S30) is carried out by extending the initial depth values of the portion of the 3D depth image information 30 that corresponds to each residual-surface block 320 (e.g., the 3D depth image initial-depth matrix of each residual-surface block 320) to the corresponding to-be-repaired block 330 at least once, in order for the corresponding to-be-repaired block 330 to be covered with the initial depth values at least once and end up as a repaired block 340.

Figure 6D:
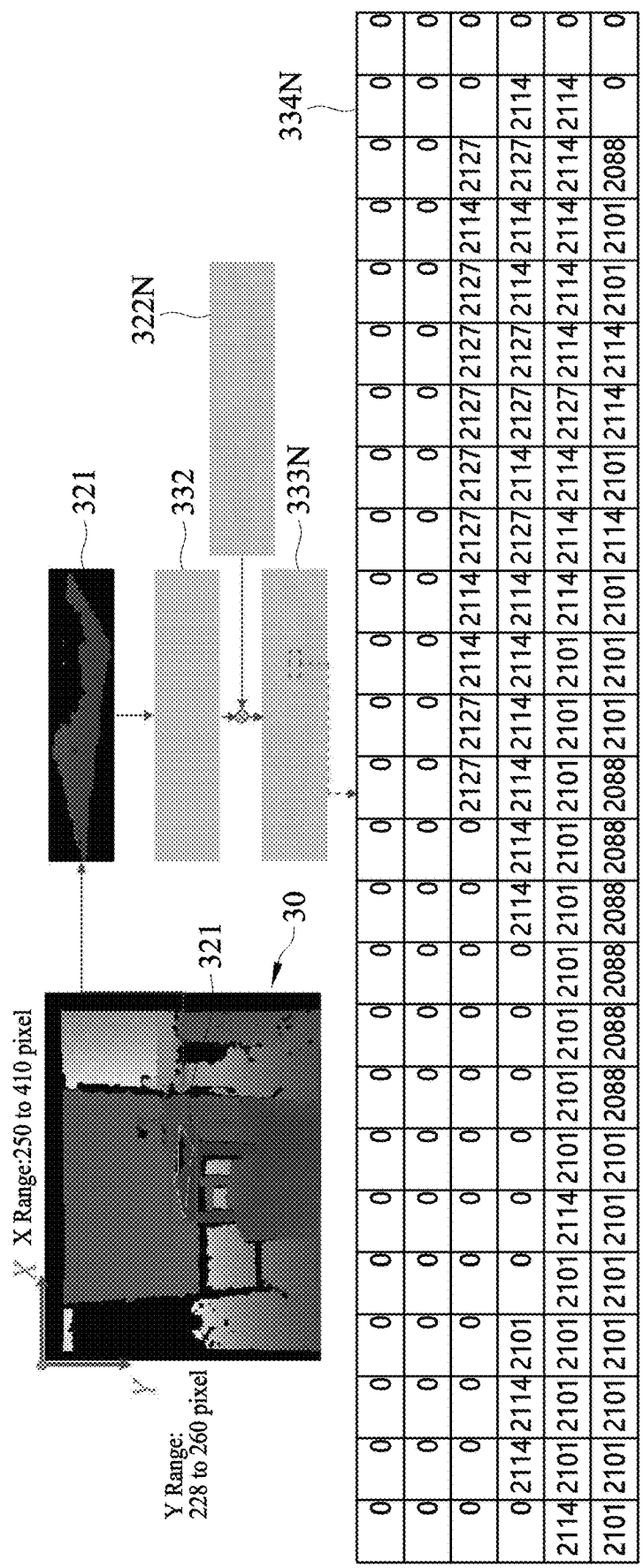
FIG. 6D shows an example of an $N^{th}$-computation depth matrix according to the invention.

FIG. 6D shows an example of how to generate an N$^{th}$-computation depth matrix 333N. In this example, a partial 3D depth image 321, which corresponds to the selected 3D reconstruction block 310, is taken from the 3D depth image information 30 and corresponds to the computational frame matrix 332. The computational frame matrix 332 and the corresponding residual-surface block matrix 322N are added together to generate the N$^{th}$-computation depth matrix 333N. A partial enlarged view 334N of the $N^{th}$-computation depth matrix 333N is also shown in FIG. 6D to enable better understanding of the $N^{th}$-computation depth matrix 333N.

It should be pointed out that the initial-depth matrix is the basis on which to perform the repairing steps that follow, so the values in the initial-depth matrix remain unchanged. To facilitate the performance of subsequent steps, therefore, the initial-depth matrix is reproduced upon establishment to generate the first-computation depth matrix 333N.

Figure 6E:
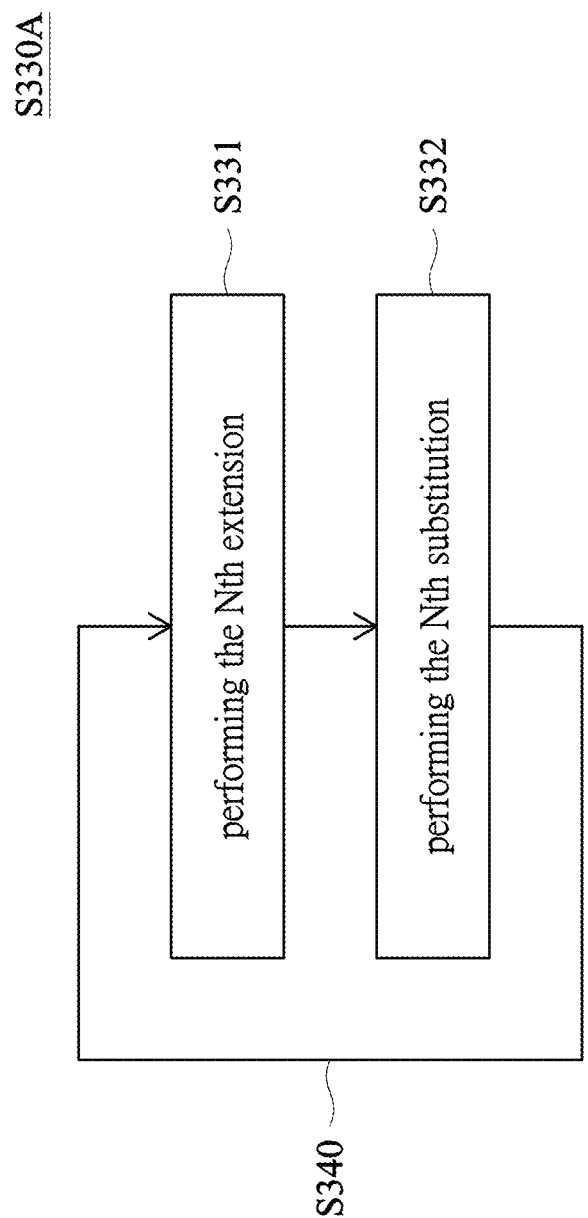
FIG. 6E shows the flowchart of the first embodiment of the 3D depth image reconstruction sub-step of the invention.

FIG. 6E shows the first embodiment S330A of the sub-step of performing 3D depth image reconstruction (S330). The 3D depth image reconstruction sub-step (S330A) includes: performing the $N^{th}$ extension (S331), performing the $N^{th}$ substitution (S332), and repeating the 3D depth image reconstruction sub-step (S340).

Performing the $N^{th}$ extension (S331) is a repairing process involving extending the $N^{th}$-computation depth matrix 333N to generate the $N+1^{th}$-computation depth matrix 333N1. In other words, the $N+1^{th}$-computation depth matrix 333N1 is the result of repairing the $N^{th}$-computation depth matrix 333N.

Performing the $N^{th}$ substitution (S332) involves restoring the residual-surface block corresponding to the $N+1^{th}$-computation depth matrix 333N1 to the initial depth values in the corresponding initial-depth matrix. That is to say, performing the $N^{th}$ substitution (S332) is to restore the residual-surface block of the $N+1^{th}$-computation depth matrix 333N1 to its initial state so that subsequent extension and repair can be carried out.

Figure 6F:
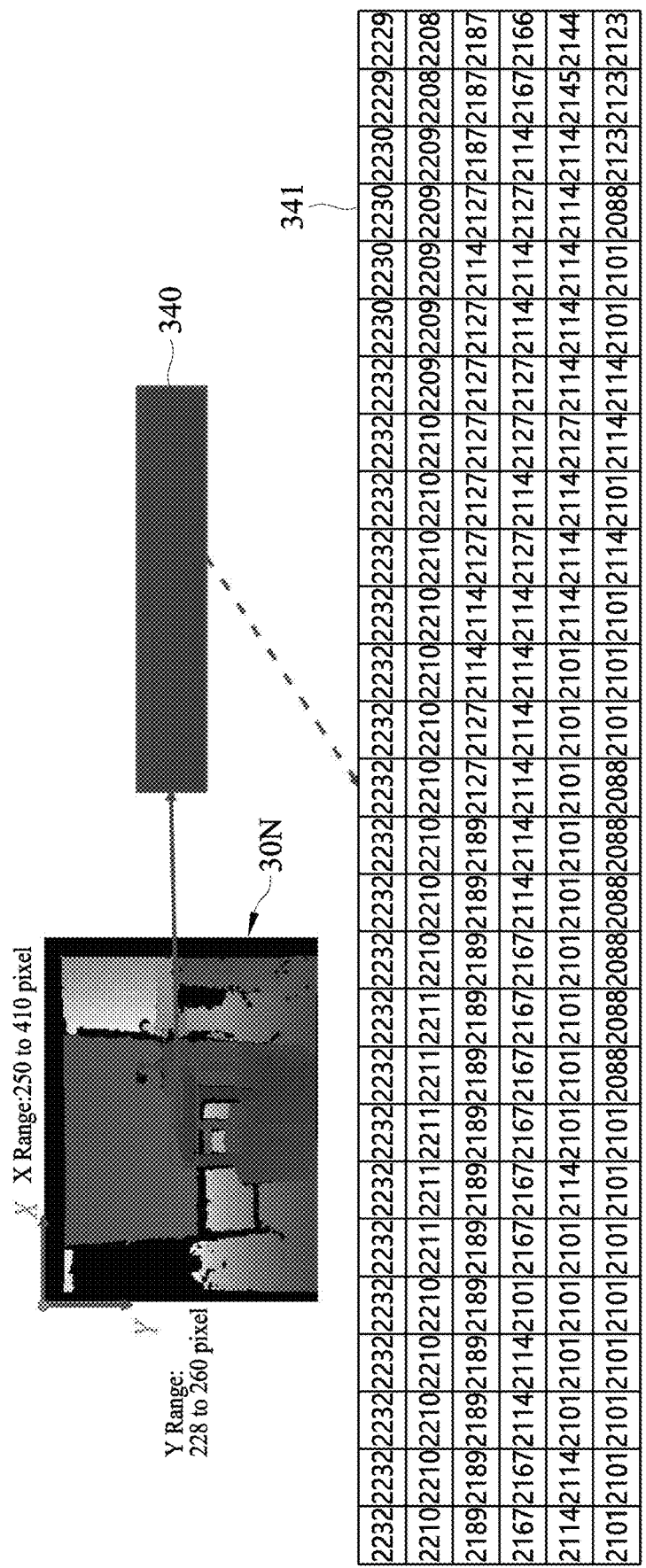
FIG. 6F shows an example of the result of conducting multiple repairs according to the invention.

FIG. 6F shows an image 30N that has been repaired for multiple times, along with a partial enlarged view 340 of the image. The partial enlarged view 340 corresponds to a depth matrix 341 that shows the results of the multiple repairs. Repeating the 3D depth image reconstruction sub-step (S340) includes performing the $N^{th}$ extension (S331) and the $N^{th}$ substitution (S332) again to achieve gradual repairment.

Figure 7A:
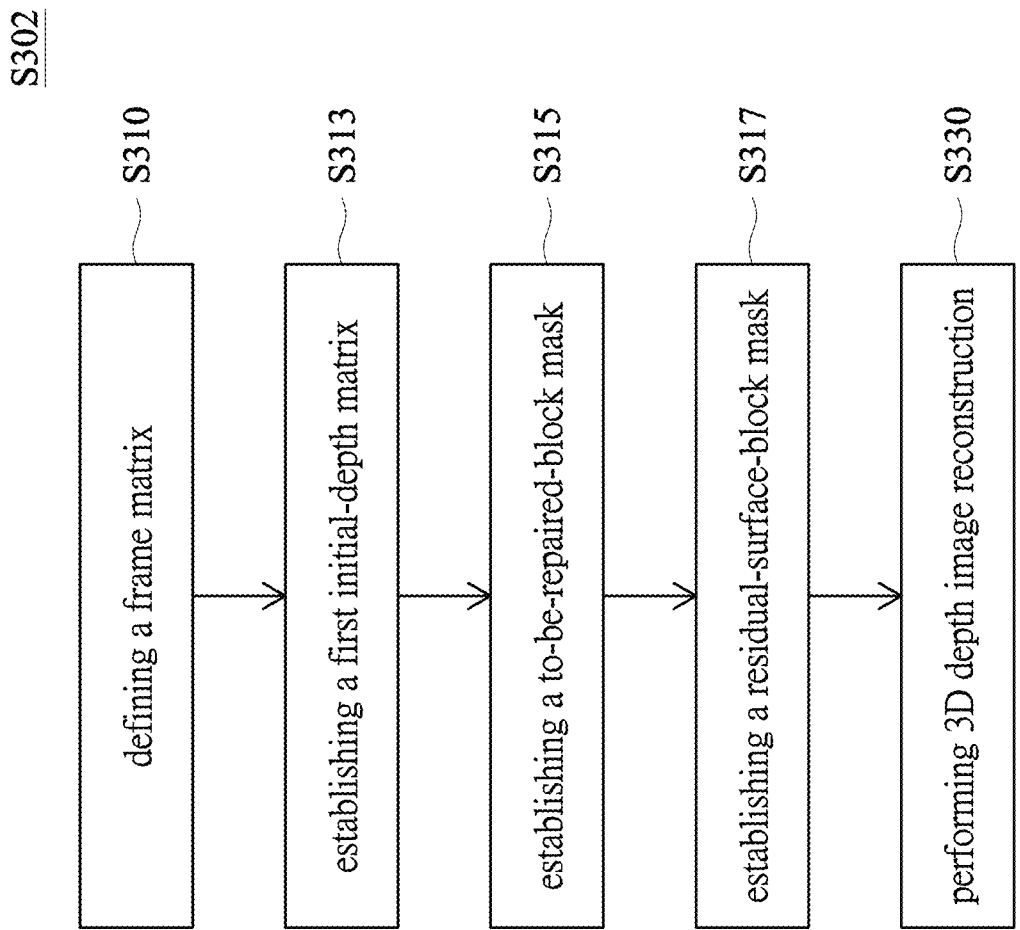
FIG. 7A is the flowchart of the second embodiment of performing 3D reconstruction according to the invention.

Apart from the foregoing first embodiment, the step of performing 3D reconstruction (S30) can be conducted in a different way, as demonstrated by the second embodiment S302 shown in FIG. 7A. The step of performing 3D reconstruction (S302) includes the sub-steps, to be performed for each 3D reconstruction block, of: defining a frame matrix (S310), establishing a first initial-depth matrix (S313), establishing a to-be-repaired-block mask (S315), establishing a residual-surface-block mask (S317), and performing 3D depth image reconstruction (S330).

Referring back to FIG. 6B, the sub-step of defining a frame matrix (S310) is carried out in the same way as in the first embodiment by setting a computational frame matrix 332, or Zexp(x,y) 332, whose size is larger than or equal to that of a particular 3D reconstruction block 310. The computational frame matrix 332, or Zexp(x,y) 332, is an empty matrix so that subsequent computation for the same space can share this computational frame.

Referring back to FIG. 6C, the sub-step of establishing a first initial-depth matrix (S313) is performed by filling the computational frame matrix 332 with the depth values corresponding to the aforesaid 3D reconstruction block 310. During the process of filling the computational frame matrix 332 with depth values, the value 0 is used whenever an element of the computational frame matrix 332 does not have a corresponding depth value to fill with. A first initial-depth matrix 333 is formed when the filling process is completed.

As in the first embodiment, referring back to FIG. 6D, the first initial-depth matrix 333 is the basis on which to perform the repairing steps that follow. To facilitate the performance of subsequent steps, therefore, the first initial-depth matrix 333 is reproduced upon establishment to generate an $N^{th}$-computation depth matrix 333N.

Figure 7B:
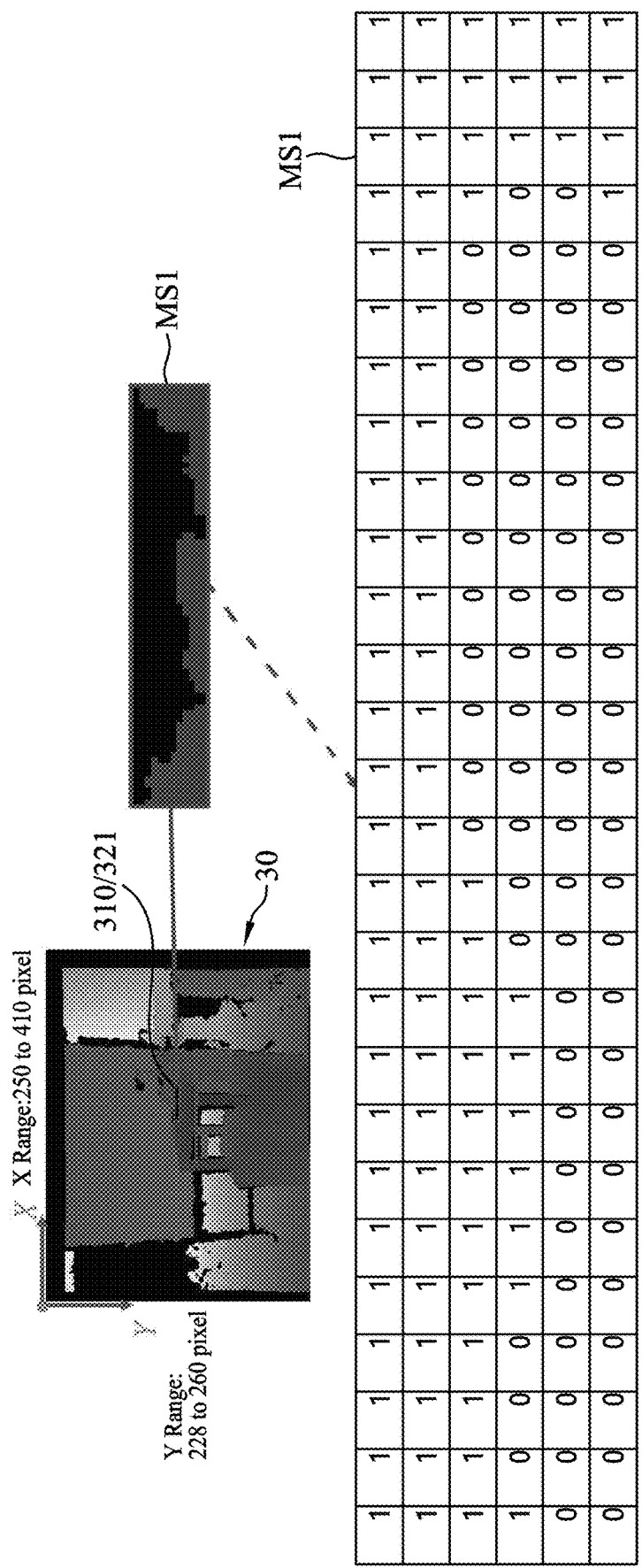
FIG. 7B shows an example of a to-be-repaired-block mask according to the invention.

FIG. 7B shows an example of how to establish a to-be-repaired-block mask (S315). In this example, a partial 3D depth image 321, which corresponds to the aforesaid 3D reconstruction block 310, is taken from the 3D depth image information 30 and corresponds to a to-be-repaired-block mask MS1.

To perform the sub-step of establishing a to-be-repaired-block mask (S315), which serves mainly to facilitate subsequent computation, each element of the first initial-depth matrix 333 that is a depth value is set to 0, and each element that is not a depth value is set to 1.

Figure 7C:
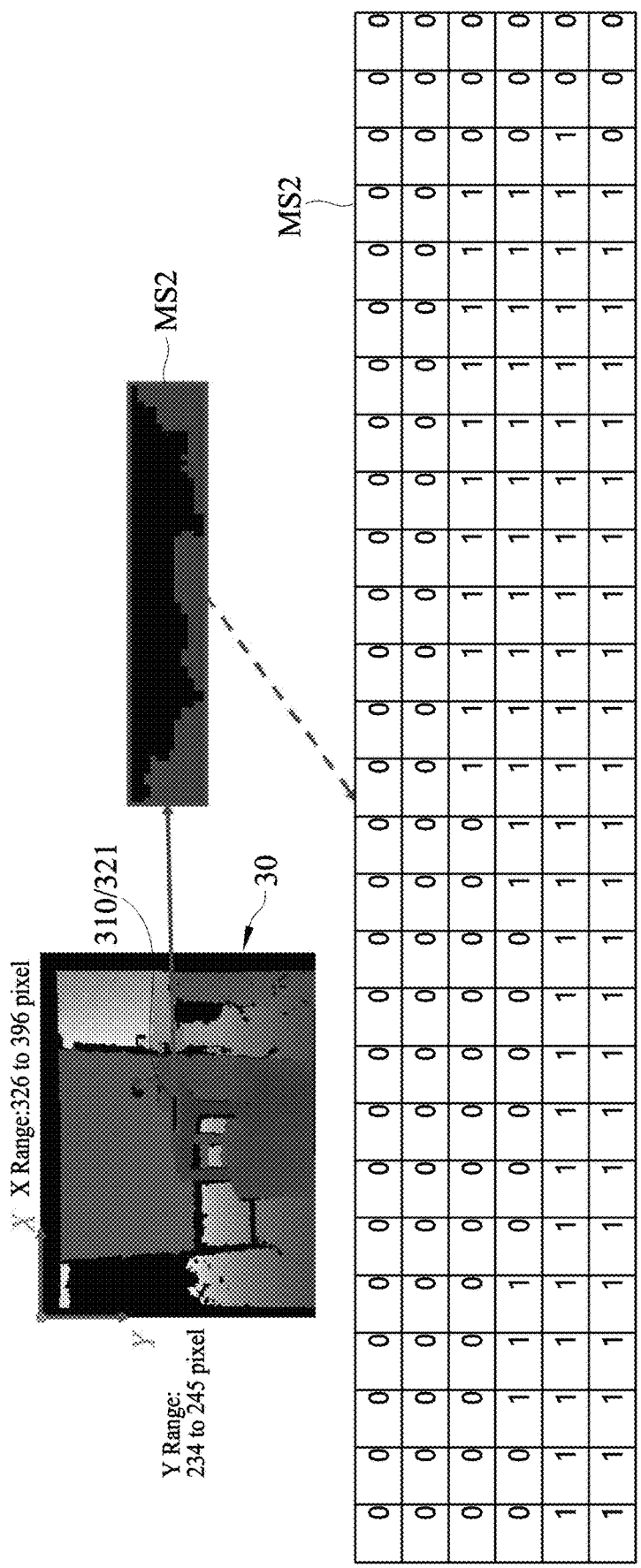
FIG. 7C shows an example of a residual-surface-block mask according to the invention.

FIG. 7C shows an example of how to establish a residual-surface-block mask MS2. In this example, a partial 3D depth image 321, which corresponds to the aforesaid 3D reconstruction block 310, is taken from the 3D depth image information 30 and corresponds to the residual-surface-block mask MS2. The sub-step of establishing a residual-surface-block mask (S317) involves setting each element of the first initial-depth matrix 333 that is a depth value to 1, and each element that is not a depth value to 0, so as to obtain the corresponding residual-surface-block mask MS2. The residual-surface-block mask MS2 is used to facilitate computation in the following 3D depth image reconstruction sub-step.

Figure 7D:
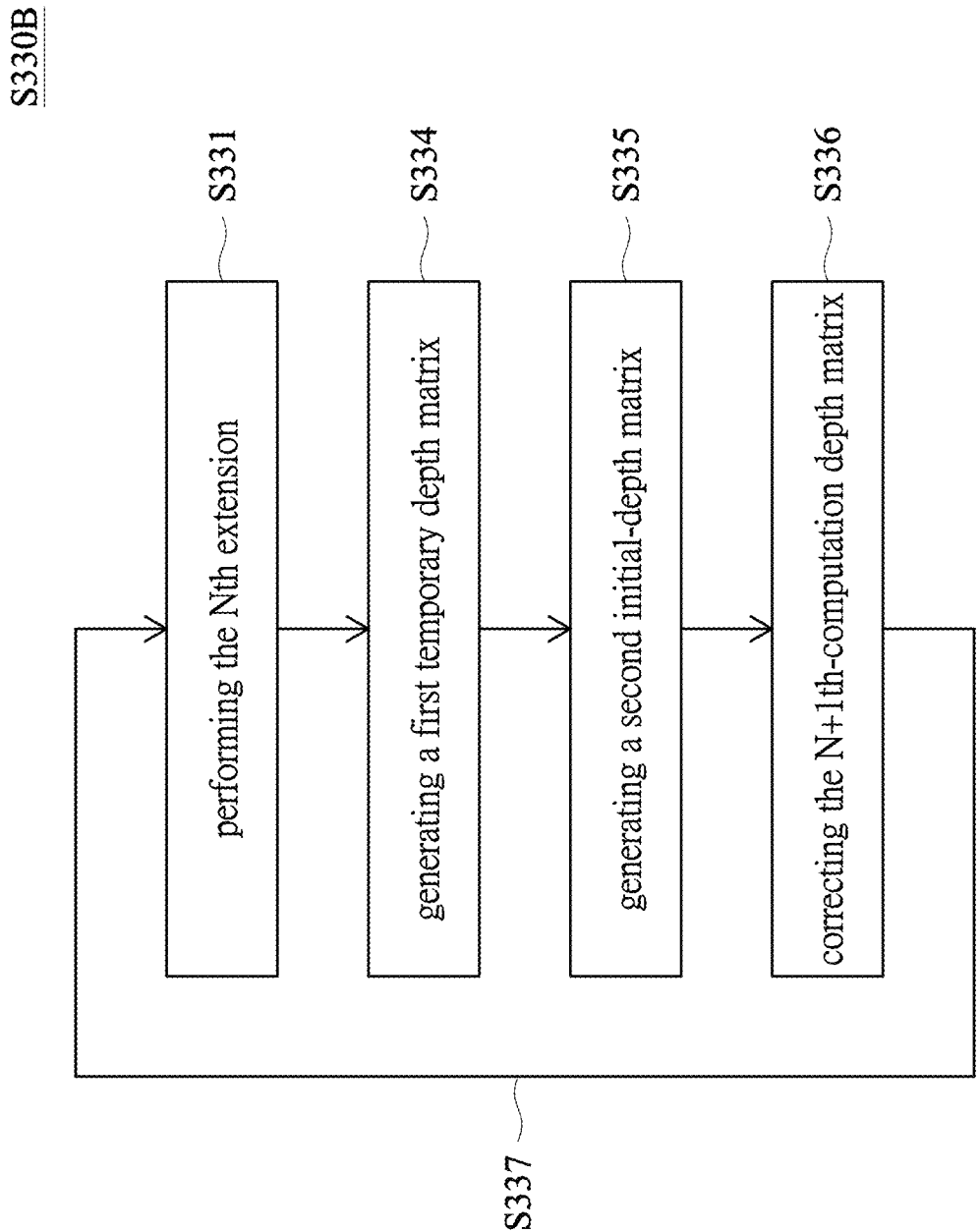
FIG. 7D shows the flowchart of the second embodiment of the 3D depth image reconstruction sub-step of the invention.

FIG. 7D shows the second embodiment S330B of the sub-step of performing 3D depth image reconstruction (S330). The 3D depth image reconstruction sub-step (S330B) includes: performing the $N^{th}$ extension (S331), generating a first temporary depth matrix (S334), generating a second initial-depth matrix (S335), correcting the $N+1^{th}$-computation depth matrix (S336), and repeating the 3D depth image reconstruction sub-step (S337).

Figure 7E:
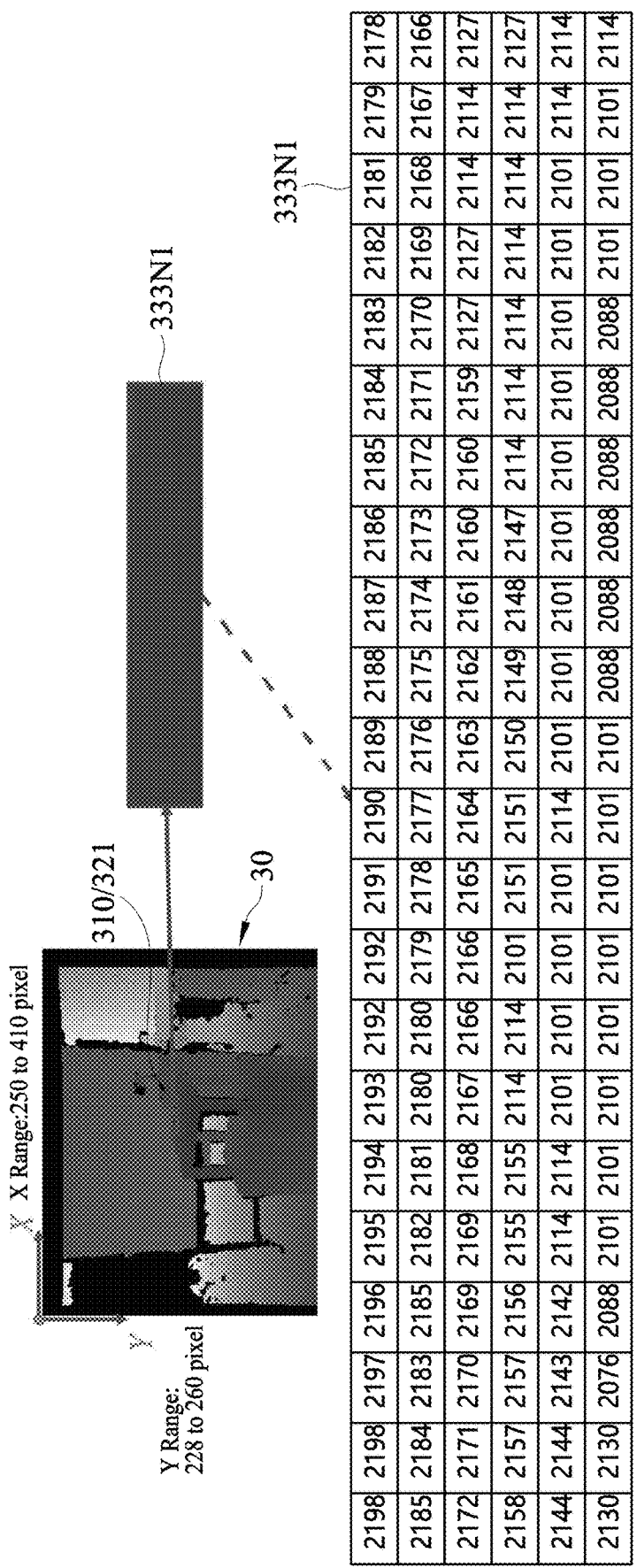
FIG. 7E shows an example of an $N+1^{th}$-computation depth matrix according to the invention.

FIG. 7E shows the partial 3D depth image corresponding to an $N+1^{th}$-computation depth matrix 333N1, an enlarged view of the partial 3D depth image, and the $N+1^{th}$-computation depth matrix itself. Performing the $N^{th}$ extension (S331) is a repairing process involving extending the $N^{th}$-computation depth matrix 333N to generate the $N+1^{th}$-computation depth matrix 333N1. The $N+1^{th}$-computation depth matrix 333N1 is the result of the first repair.

Figure 7F:
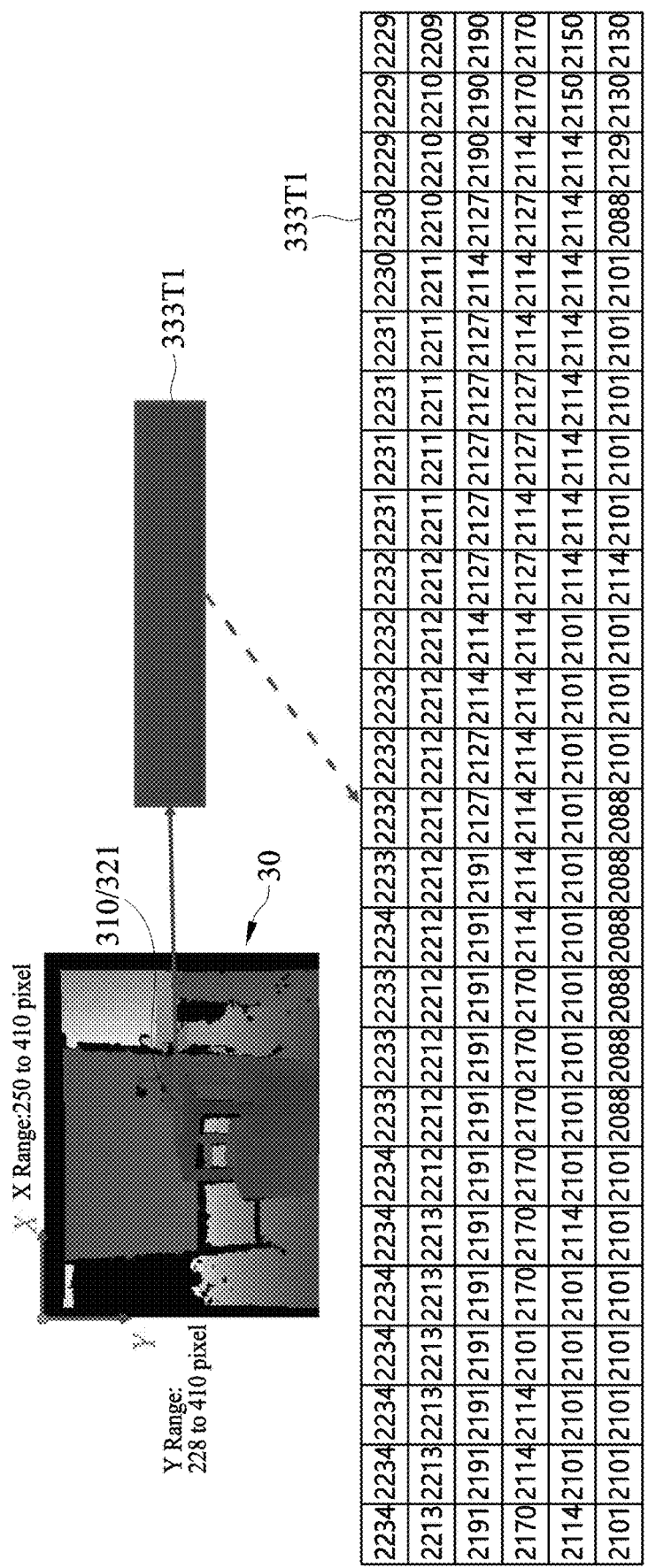
FIG. 7F shows an example of a first temporary depth matrix according to the invention.

FIG. 7F shows an example of how to generate a first temporary depth matrix. In this example, a partial 3D depth image 321, which corresponds to the aforesaid 3D reconstruction block 310, is taken from the 3D depth image information 30 and corresponds to a first temporary depth matrix 333T1. The first temporary depth matrix 333T1 is generated by masking the $N+1^{th}$-computation depth matrix 333N1 with the to-be-repaired-block mask MS1.

Figure 7G:
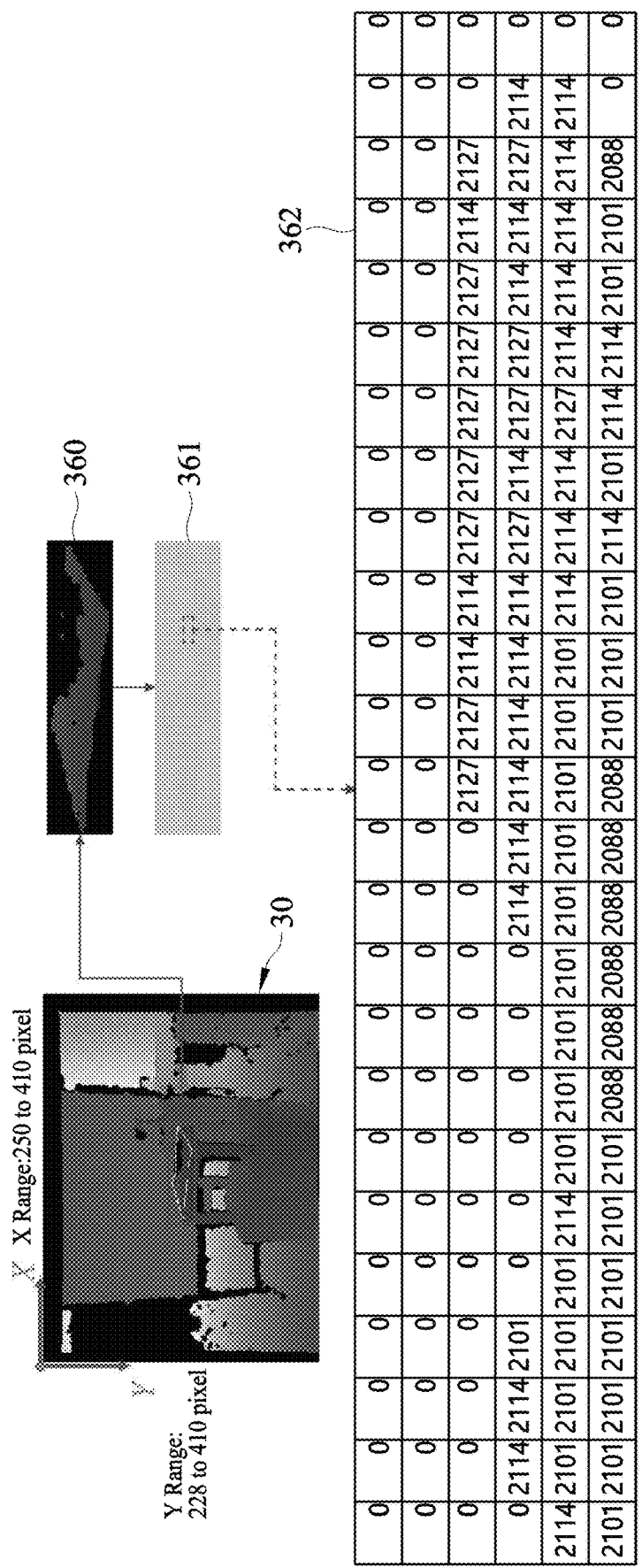
FIG. 7G shows an example of a second initial-depth matrix according to the invention.

FIG. 7G shows an example of how to generate a second initial-depth matrix 361. In this example, a partial depth image 360 is taken from the 3D depth image information 30 and corresponds to the second initial-depth matrix 361. A partial enlarged view 362 of the second initial-depth matrix 361 is also shown in FIG. 7G to enable better understanding of the contents of the second initial-depth matrix 361. Generating a second initial-depth matrix (S335) involves masking the first initial-depth matrix 333 with the corresponding residual-surface-block mask MS2.

Figure 7H:
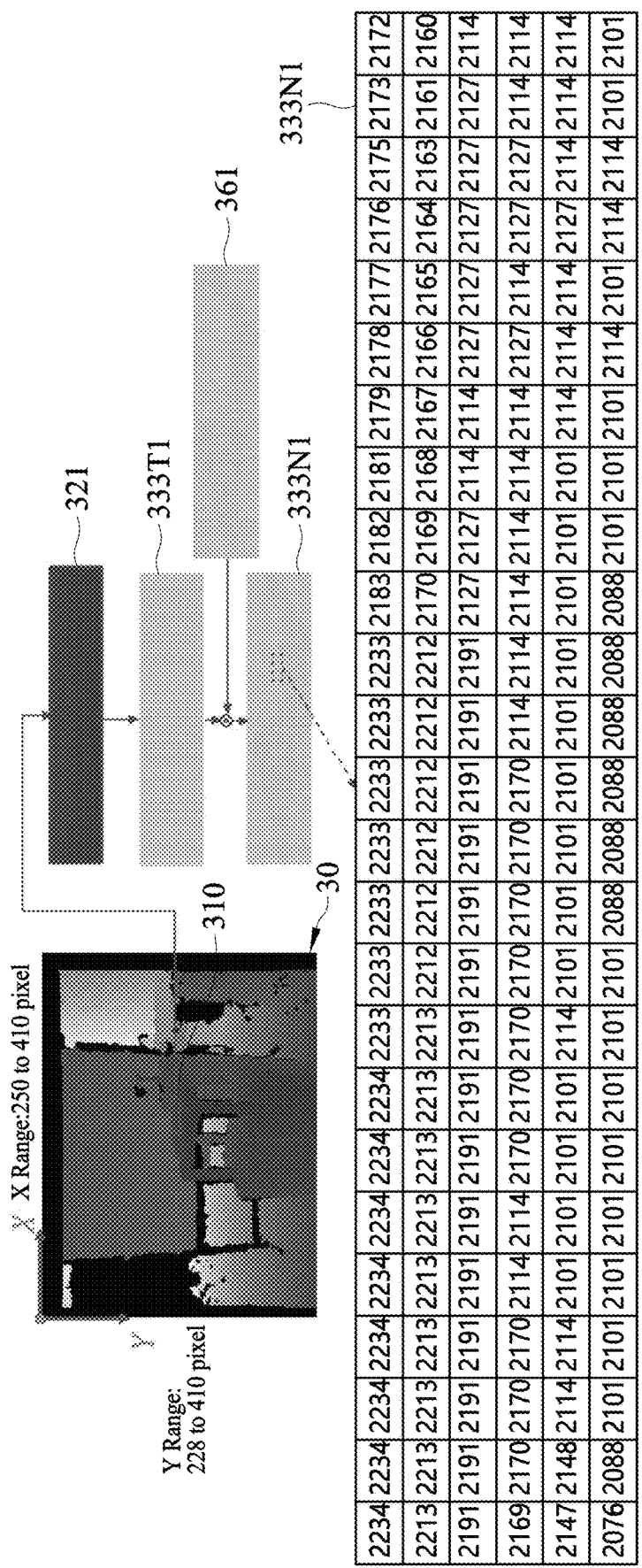
FIG. 7H shows an example of a corrected N+1$^{th}$-computation depth matrix according to the invention.

FIG. 7H shows an example of how to correct the $N+1^{th}$-compution depth matrix (S339). In this example, a partial 3D depth image 321, which corresponds to the aforesaid 3D reconstruction block 310, is taken from the 3D depth image information 30 and corresponds to a corrected $N+1^{th}$-computation depth matrix 333N1. The corrected $N+1^{th}$-computation depth matrix 333N1 is generated by adding together the first temporary depth matrix 333T1 and the second initial-depth matrix 361.

Repeating the 3D depth image reconstruction sub-step (S337) includes performing the $N^{th}$ extension (S331), the generation of a first temporary depth matrix 333T1, the generation of a second initial-depth matrix (S335), and the correction of the $N+1^{th}$-computation depth matrix (S339) over and over again until the difference between the residual-surface block corresponding to the $N+1^{th}$-computation depth matrix 333N1 and the corresponding initial values is acceptable.

The $N^{th}$ extension can be carried out by performing Fourier-domain low-pass filtering on the $N^{th}$-computation depth matrix, or by performing Fourier-domain low-pass filtering on the $N^{th}$-computation depth matrix for a plurality of times with a gradual increase in the filter aperture.

The $N^{th}$ extension can also be carried out by performing extrapolation or interpolation on the $N^{th}$-computation depth matrix, or by performing surface fitting on the $N^{th}$-computation depth matrix.

Alternatively, the $N^{th}$ extension can be carried out by performing Laplace-domain low-pass filtering on the $N^{th}$-computation depth matrix, or by performing Laplace-domain low-pass filtering on the $N^{th}$-computation depth matrix for a plurality of times with a gradual increase in the filter aperture.

Or, the $N^{th}$ extension can be carried out by performing wavelet transform-domain low-pass filtering on the $N^{th}$-computation depth matrix, or by performing wavelet transform-domain low-pass filtering on the $N^{th}$-computation depth matrix for a plurality of times with a gradual increase in the filter aperture.

It is also feasible to carry out the $N^{th}$ extension by performing a convolutional operation on the $N^{th}$-computation depth matrix and a point spread function, or by performing a convolutional operation on the $N^{th}$-computation depth matrix for a plurality of times with a gradual decrease in the point spread function width.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A method for repairing an incomplete three-dimensional (3D) depth image using two-dimensional (2D) image information, comprising the steps of:
    obtaining image information, wherein the image information comprises 2D image information and 3D depth image information that correspond to each other;
    defining specific 2D blocks by dividing the 2D image information into a plurality of 2D reconstruction blocks and a plurality of 2D reconstruction boundaries corresponding respectively to the 2D reconstruction blocks, and transforming each said 2D reconstruction block into a corresponding 3D reconstruction block and a 3D reconstruction boundary corresponding to the 3D reconstruction block;
    obtaining residual-surface blocks by analyzing each said 3D reconstruction block and dividing each said 3D reconstruction block into a said residual-surface block, whose corresponding portion of the 3D depth image information includes depth value information, and a to-be-repaired block outside, and corresponding to, the residual-surface block; and
    performing 3D reconstruction by extending initial depth values of the portion of the 3D depth image information that corresponds to each said residual-surface block to the corresponding to-be-repaired block at least once such that the corresponding to-be-repaired blocked is covered with the initial depth values at least once and consequently forms a repaired block.

2. The method of claim 1, wherein the 2D reconstruction blocks are defined by artificial intelligence-based division, color block-based division, or boundary-based division.

3. The method of claim 1, wherein the step of performing 3D reconstruction comprises the sub-steps, to be performed for each said 3D reconstruction block, of:
    defining a frame matrix by setting a computational frame matrix Zexp(x,y) larger than or equal to the each said 3D reconstruction block in size;
    establishing an initial-depth matrix by filling the computational frame matrix with the depth values corresponding to the each said 3D reconstruction block and with the value 0 if any element of the computational frame matrix does not have a corresponding said depth value to fill with, and reproducing the initial-depth matrix to generate a first-computation depth matrix; and
    performing 3D depth image reconstruction, comprising:
        performing an $N^{th}$ extension by extending the $N^{th}$-computation depth matrix to generate an $N+1^{th}$-computation depth matrix;
        performing an $N^{th}$ substitution by restoring a portion of the $N+1^{th}$-computation depth matrix that corresponds to the corresponding residual-surface block to the initial depth values in the corresponding initial-depth matrix; and
        repeating the sub-step of performing 3D depth image reconstruction.

4. The method of claim 1, wherein the step of performing 3D reconstruction comprises the sub-steps, to be performed for each said 3D reconstruction block, of:
    defining a frame matrix by setting a computational frame matrix Zexp(x,y) larger than or equal to the each said 3D reconstruction block in size;
    establishing a first initial-depth matrix by filling the computational frame matrix with the depth values corresponding to the each said 3D reconstruction block and with the value 0 if any element of the computational frame matrix does not have a corresponding said depth value, and reproducing the first initial-depth matrix to generate an $N^{th}$-computation depth matrix;
    establishing a to-be-repaired-block mask by setting to the value 0 each element of the first initial-depth matrix that is a said depth value, and to the value 1 each said element of the first initial-depth matrix that is not a said depth value;
    establishing a residual-surface-block mask by setting to the value 1 each said element of the first initial-depth matrix that is a said depth value, and to the value 0 each said element of the first initial-depth matrix that is not a said depth value; and performing 3D depth image reconstruction, comprising:
  performing an $N^{th}$ extension by extending the $N^{th}$-computation depth matrix to generate an $N+1^{th}$-computation depth matrix;
  generating a first temporary depth matrix by masking the $N+1^{th}$-computation depth matrix with the to-be-repaired-block mask;
  generating a second initial-depth matrix by masking the first initial-depth matrix with the residual-surface-block mask;
  correcting the $N+1^{th}$-computation depth matrix by adding together the first temporary depth matrix and the second initial-depth matrix; and
  repeating the sub-step of performing 3D depth image reconstruction.

5. The method of claim 3, wherein said performing an $N^{th}$ extension comprises performing Fourier-domain low-pass filtering on the $N^{th}$-computation depth matrix.

6. The method of claim 3, wherein said performing an $N^{th}$ extension comprises performing Fourier-domain low-pass filtering on the $N^{th}$-computation depth matrix for a plurality of times with a sequentially increased filter aperture.

7. The method of claim 3, wherein said performing an $N^{th}$ extension comprises performing interpolation or extrapolation on the $N^{th}$-computation depth matrix.

8. The method of claim 3, wherein said performing an $N^{th}$ extension comprises performing surface fitting on the $N^{th}$-computation depth matrix.

9. The method of claim 3, wherein said performing an $N^{th}$ extension comprises performing Laplace-domain low-pass filtering on the $N^{th}$-computation depth matrix.

10. The method of claim 3, wherein said performing an $N^{th}$ extension comprises performing Laplace-domain low-pass filtering on the $N^{th}$-computation depth matrix for a plurality of times with a sequentially increased filter aperture.

11. The method of claim 3, wherein said performing an $N^{th}$ extension comprises performing wavelet transform-domain low-pass filtering on the $N^{th}$-computation depth matrix.

12. The method of claim 3, wherein said performing an $N^{th}$ extension comprises performing wavelet transform-domain low-pass filtering on the $N^{th}$-computation depth matrix for a plurality of times with a sequentially increased filter aperture.

13. The method of claim 3, wherein said performing an $N^{th}$ extension comprises performing a convolutional operation on the $N^{th}$-computation depth matrix and a point spread function.

14. The method of claim 3, wherein said performing an $N^{th}$ extension comprises performing a convolutional operation on the $N^{th}$-computation depth matrix for a plurality of times with a sequentially decreased point-spread function width.

* * * * *